United States Patent
Yamaguchi et al.

(10) Patent No.: US 6,881,796 B2
(45) Date of Patent: Apr. 19, 2005

(54) SOLID TYPE PRESSURE-SENSITIVE ADHESIVE COMPOSITION AND PRESSURE-SENSITIVE ADHESIVE SHEETS USING THE SAME

(75) Inventors: Tomoo Yamaguchi, Osaka (JP); Yasunobu Ina, Osaka (JP); Isao Hirose, Osaka (JP); Kunihiko Kaita, Osaka (JP); Shuzo Fujiwara, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/742,363

(22) Filed: Dec. 22, 2000

(65) Prior Publication Data

US 2001/0006723 A1 Jul. 5, 2001

(30) Foreign Application Priority Data

Dec. 27, 1999 (JP) .......................................... 11-369357

(51) Int. Cl.⁷ .............................................. C08C 19/00
(52) U.S. Cl. .................. 525/332.7; 525/374; 427/207.1; 427/208.4
(58) Field of Search .......................... 427/207.1, 208.4; 525/332.7, 374; 428/220, 332, 343, 355 R, 356, 355 N, 411.1, 423.1, 492, 926; 264/241

(56) References Cited

U.S. PATENT DOCUMENTS 3,914,484 A * 10/1975 Creegan et al. ................ 428/42
5,776,998 A * 7/1998 Southwick et al. .......... 522/111
6,251,517 B1 * 6/2001 Sashihara et al. ..... 428/355 AC

FOREIGN PATENT DOCUMENTS

| GB | 1 389 853 | | 4/1975 |
| JP | 11-80690 A | | 3/1999 |
| JP | 11-80690 | * | 3/1999 |

OTHER PUBLICATIONS

"Research of Thermally Cured Special Pressure–Sensitive Adhesive Strips for Use in Electronic Capacitors", China Adhesives, vol. 3, No. 5, 1994, with partial English translation.

* cited by examiner

*Primary Examiner*—Sheeba Ahmed
(74) *Attorney, Agent, or Firm*—Sughrue Mion, PLLC

(57) ABSTRACT

A solid type pressure-sensitive adhesive composition containing a rubbery polymer as the main polymer; and pressure-sensitive adhesive sheets which use the pressure-sensitive adhesive composition, are excellent in adhesive strength and holding power, retain the intact holding power even when allowed to stand at high temperatures or made to have a reduced adhesive layer thickness, and are free from the problem of adhesive protrusion or adhesive remaining. The pressure-sensitive adhesive sheets comprise a substrate and formed thereon a layer comprising a solid type pressure-sensitive adhesive composition obtained by a method comprising adding a tackifier to a rubbery polymer and treating the resultant mixture with an isocyanate crosslinking agent to crosslink the polymer.

15 Claims, No Drawings

SOLID TYPE PRESSURE-SENSITIVE ADHESIVE COMPOSITION AND PRESSURE-SENSITIVE ADHESIVE SHEETS USING THE SAME

FIELD OF THE INVENTION

The present invention relates to a solid type pressure-sensitive adhesive composition and pressure-sensitive adhesive sheets which are obtained by applying the composition on a substrate with heating and is in the form of sheet, tape, etc.

DESCRIPTION OF THE RELATED ART

Cloth-backing pressure-sensitive adhesive tapes for packaging, e.g., packing in corrugated fiberboard containers, double-faced pressure-sensitive adhesive tapes for carpet fixing, and the like are produced by thermally softening a solid type pressure-sensitive adhesive composition comprising a rubbery polymer and a tackifier and applying the softened composition on a substrate such as a cloth with a calender roll coater, extruder, or the like in a thickness of usually 100 μm or larger.

The solid type pressure-sensitive adhesive composition for use in this method is a solvent-free, non-aqueous, pressure-sensitive adhesive composition which contains neither any organic solvent causative of environmental pollution nor water, which necessitates much energy for drying. This pressure-sensitive adhesive composition, which is solid at ordinary temperature, is usually prepared by adding a tackifier to a rubbery polymer such as, e.g., natural rubber as the main ingredient, usually further adding a filler such as fine calcium carbonate particles, a softener such as an oil, an antioxidant, and other additives in appropriate proportions, and kneading the resultant mixture with a kneader, Banbury mixer, mixing roll mill, or the like with heating.

Incidentally, pressure-sensitive adhesive sheets are required to have adhesive strength, which enables the adhesive sheets to conform to adherends and adhere thereto tightly, and holding power, which enables the adhesive sheets to retain that state even when force is applied thereto after application. Pressure-sensitive adhesive sheets are generally evaluated based on these properties. The latter property, holding power, means the cohesive power which prevents the pressure-sensitive adhesive layer from being gradually elongated after application of the pressure-sensitive adhesive tape when a tensile force is applied to the tape, i.e., a shearing stress is applied to the pressure-sensitive adhesive.

However, the cloth-backing pressure-sensitive adhesive tapes for packaging, double-faced pressure-sensitive adhesive tapes for carpet fixing, and the like produced with the solid type pressure-sensitive adhesive composition described above have insufficient cohesive power at elevated temperatures although satisfactory in adhesive strength. Consequently, use of such pressure-sensitive adhesive tapes has often posed a problem that the pressure-sensitive adhesive layer is gradually elongated by shearing stress or the adhesive protrudes or remains. Although a technique is being used in which a pressure-sensitive adhesive layer having an increased thickness of 100 μm or larger as stated above is formed so that the shearing caused by shearing stress is received by the whole adhesive, this technique is still insufficient. Reducing the adhesive layer thickness beyond that value has been utterly impractical in view of those problems.

Since solid type pressure-sensitive adhesive compositions contain a rubbery polymer such as natural rubber as the main polymer, the cohesive power thereof can be increased by vulcanizing the polymer with a vulcanizing agent such as, e.g., the sulfur, thiuram, or quinoid type as in ordinary rubber products. This technique may be effective in avoiding the problems described above. However, as the degree of vulcanization increases, tack decreases abruptly and adhesive strength also decreases considerably. In addition, with increasing vulcanization degree, the composition becomes unable to be thermally softened and hence unusable in forming a pressure-sensitive adhesive tape. Reducing the amount of a vulcanizing agent so as to conduct slight vulcanization results in difficulties in initiating a vulcanization reaction. In this case, however, once the reaction begins, it cannot be stopped. It has after all been difficult to regulate the vulcanization to a moderate degree.

Another technique has hence been proposed, which comprises completely vulcanizing a polymer with a vulcanizing agent, pulverizing the vulcanizate, and incorporating the pulverized vulcanizate as nuclei into an unvulcanized composition to thereby give a solid type pressure-sensitive adhesive composition having improved cohesive power. However, this technique is impractical because the process for producing the pressure-sensitive adhesive composition is complicated and the processing is costly. This technique is hence applicable only to the production of special pressure-sensitive adhesive tapes. Furthermore, this technique is ineffective in eliminating the problems of adhesive protrusion and adhesive remaining because not all the polymer molecules are vulcanized.

As described above, it has been difficult to moderately vulcanize all the polymer molecules in a solid type pressure-sensitive adhesive composition comprising a rubbery polymer as the main polymer by a practical method. Consequently, the double-faced pressure-sensitive adhesive tapes and the like using such a conventional solid type pressure-sensitive adhesive composition not only unavoidably suffer a decrease in holding power when allowed to stand at a high temperature or made to have a reduced adhesive layer thickness, but also still have the problems of adhesive protrusion and adhesive remaining.

SUMMARY OF THE INVENTION

Under these circumstances, one object of the invention is to provide a solid type pressure-sensitive adhesive composition which contains a rubbery polymer as the main polymer and has been crosslinked by a method different from the vulcanization method described above. This composition has enhanced cohesive power while retaining adhesive strength and hence gives a pressure-sensitive adhesive sheet which is inhibited from suffering a decrease in holding power when allowed to stand at high temperature or made to have a reduced adhesive layer thickness and which is free from the problem of adhesive protrusion or adhesive remaining.

Another object of the invention is to provide pressure-sensitive adhesive sheets using the composition.

Still another object of the invention is to provide a method of producing the pressure-sensitive adhesive sheets.

The present inventors first thought that the vulcanization method described above necessarily results in too high a crosslink density and is unsuitable for moderate or weak crosslinking capable of maintaining adhesive strength, because the conventional vulcanization proceeds by a reaction mechanism in which a vulcanizing agent of, e.g., the sulfur type acts on unsaturated bonds contained in the molecular backbone of the rubbery polymer to directly crosslink the polymer molecules. The inventors directed attention to a technique of crosslinking through reactions between functional groups as a substitute for the conventional crosslinking. Namely, in view of the fact that there are cases where functional groups such as hydroxyl and carboxyl groups are incorporated into side chains of polymer molecules in producing a rubbery polymer or cases where an ingredient having such functional groups, such as, e.g., a protein, comes in a slight amount into the rubbery polymer, the inventors thought that moderate crosslinking capable of maintaining adhesive strength can be realized when a polyfunctional compound having functional groups reactive with those functional groups is added to conduct crosslinking through reactions between the functional groups while regulating the addition amount thereof.

In this case, however, the polyfunctional compound is added in an amount of about 1 to 3% by weight based on the whole composition, and this amount is considerably small as compared with the amounts of other ingredients including the rubbery polymer and a tackifier. It can be easily presumed that in the case of a composition dissolved in an organic solvent or dispersed in water, a polyfunctional compound can be evenly dissolved or dispersed, even when added in such a slight amount, to attain even crosslinking. However, in the case of a solid type composition to be kneaded with a pressure kneader or the like with heating, it is difficult to predict as to whether a polyfunctional compound can be evenly dispersed and used to attain even crosslinking as in the solution or dispersion type. In addition, when kneading is conducted over a prolonged period with heating, the molecular chain of the rubbery polymer may be cleaved by heat and shearing force, resulting in a reduced molecular weight. Hence, the incorporation of a polyfunctional compound may reduce rather than increase the cohesive power. Virtually, there are few examples in which even a rubber product other than pressure-sensitive adhesives is produced from a solid type composition through crosslinking with a polyfunctional compound such as the aforementioned one.

The inventors repeated experimental investigations by the method of trial and error in view of the technical matter of common sense described above. They selected an isocyanate crosslinking agent as a polyfunctional compound to be reacted with the functional groups having active hydrogen contained in a rubbery polymer, such as, e.g., hydroxyl or carboxyl groups, and kneaded a mixture of this crosslinking agent, the rubbery polymer, and other ingredients with heating while monitoring the kneading torque to suitably regulate the kneading temperature and the kneading time. They have found in this experiment that the crosslinking agent can be evenly dispersed in the mixture being kneaded and can be evenly reacted with the functional groups having active hydrogen contained in the polymer, without causing the polymer to undergo molecular chain cleavage and a resultant decrease in molecular weight. As a result, the desired moderate crosslinking, which is a considerably low degree of crosslinking, can be realized and cohesive power can be enhanced while maintaining adhesive strength. Thus, the inventors have found that the resultant pressure-sensitive adhesive composition can give a pressure-sensitive adhesive sheet which is inhibited from suffering a decrease in holding power when allowed to stand at a high temperature or made to have a reduced adhesive layer thickness and which is free from the problem of adhesive protrusion or adhesive remaining. The invention has been completed based on this finding.

The invention provides a solid type pressure-sensitive adhesive composition obtained by a method comprising adding a tackifier to a rubbery polymer and treating the resulting mixture with an isocyanate crosslinking agent to crosslink the polymer. In the solid type pressure-sensitive adhesive composition having the constitution described above, the rubbery polymer preferably is natural rubber.

The invention further provides pressure-sensitive adhesive sheets in the form of sheet, tape, etc., which comprise a substrate and formed thereon a layer comprising the solid type pressure-sensitive adhesive composition having the constitution described above.

The invention further provides a method of producing pressure-sensitive adhesive sheets comprising calendering or extrusion coating a solid type pressure-sensitive adhesive composition obtained by a method comprising adding a tackifier to a rubbery polymer and treating the resulting mixture with an isocyanate crosslinking agent to crosslink the polymer, on a substrate.

DETAILED DESCRIPTION OF THE INVENTION

The term "solid type" used herein means 100% solid content.

The rubbery polymer for use in the invention most preferably is a natural rubber, especially one having a Mooney viscosity $ML_{1+4}$ (100° C.) of from 20 to 100. Besides natural rubber, usable examples of the rubbery polymer include synthetic rubbers such as butyl rubber, butadiene rubber, isoprene rubber, and polyisobutylene rubber, blends of these, and blends containing at least 20% by weight of natural rubbers.

The tackifier in the invention is intended to impart tackiness and facilitate thermal softening. Various resins compatible with the rubbery polymer can be used as the tackifier. Examples thereof include petroleum resins, phenolic resins, rosin resins, and terpene resins. Such a tackifier is used in an amount of generally from 20 to 200 parts by weight, preferably from 30 to 150 parts by weight, per 100 parts by weight of the rubbery polymer.

Ingredients which can be optionally used in the invention include fillers such as calcium carbonate, talc, and magnesium oxide, softeners such as polybutene and process oils, antioxidants, and plasticizers. Such optional ingredients may be used in the following respective amounts per 100 parts by weight of the rubbery polymer. The amount of a filler is up to 200 parts by weight, preferably from 10 to 100 parts by weight, and that of a softener is up to 50 parts by weight, preferably from 5 to 50 parts by weight. Furthermore, the amount of an antioxidant is up to 5 parts by weight, preferably from 0.5 to 5 parts by weight, more preferably from 1 to 3 parts by weight.

In the invention, such optional ingredients are added to the rubbery polymer and tackifier described above as essential ingredients, and the resulting mixture is kneaded with heating without using any organic solvent or water. An isocyanate crosslinking agent is further added thereto and the mixture is continuously kneaded with heating, whereby the crosslinking agent is evenly dispersed into the mixture being kneaded and, simultaneously therewith, evenly reacted with functional groups having active hydrogen contained in the rubbery polymer, such as hydroxyl or carboxyl groups. As a result, a solid type pressure-sensitive adhesive composition is obtained in which the rubbery polymer has been crosslinked to a considerably low degree.

The isocyanate crosslinking agent is a polyisocyanate compound having two or more isocyanate groups in the molecule. Examples thereof include low molecular weight (e.g., 200–3,000) isocyanate compounds such as phenylene diisocyanate, tolylene diisocyanate, diphenylmethane diisocyanate, and hexamethylene diisocyanate, dimers and trimers of these isocyanates, and blocked isocyanates derived from these. The isocyanate crosslinking agent is used in an amount of generally from 0.1 to 20 parts by weight, preferably from 0.2 to 10 parts by weight, per 100 parts by weight of the rubbery polymer.

For the kneading with heating can be used a pressure kneader, Banbury mixer, mixing roll mill, or the like. A suitable kneading temperature in the range of about from 80 to 160° C. is selected for this kneading according to the kinds of the rubbery polymer and other ingredients. For example, in the case where the rubbery polymer is natural rubber, a temperature of 150° C. or lower should be selected. If a higher temperature is used, thermal degradation is apt to occur. A suitable kneading time which does not result in thermal deterioration is selected according to the kneading temperature while monitoring the torque during kneading. The kneading time is usually in such a range that each ingredient is kneaded for from 5 to 40 minutes in total.

The solid type pressure-sensitive adhesive composition which has been thus crosslinked has satisfactory formability because it readily softens upon heating. By applying this composition on a substrate such as, e.g., a cloth, paper, or plastic film with a calender roll coater, extruder, or the like while heating the composition, a pressure-sensitive adhesive sheet in the form of sheet, tape, etc. can be produced which comprises the substrate and formed thereon a layer of the pressure-sensitive adhesive composition. This process uses neither any organic solvent causative of environmental pollution nor water, which necessitates much energy for drying. Consequently, there is no need of conducting a step of drying with a drying oven after substrate coating. The process is hence friendly to the global environment and can greatly contribute to energy saving.

Due to an improvement in cohesive power brought about by the moderate crosslinking, the pressure-sensitive adhesive sheet of the invention thus produced is excellent not only in adhesive strength but in holding power, is inhibited from suffering a decrease in holding power upon standing at a high temperature, and is free from the problem of adhesive protrusion or adhesive remaining. The adhesive layer thickness, i.e., the thickness of the layer consisting of the pressure-sensitive adhesive composition, can be in the wide range of generally from 10 to 200 $\mu$m, preferably from 20 to 100 $\mu$m. Even when the adhesive layer thickness is reduced within that range, an abrupt decrease in holding power as in conventional pressure-sensitive adhesive tapes is not observed and the problems of adhesive protrusion and adhesive remaining can be avoided in this case also.

As described above, the pressure-sensitive adhesive sheets of the invention are useful as a cloth-backing pressure-sensitive adhesive tape for packaging, e.g., packing in corrugated fiberboard containers, or as a double-faced pressure-sensitive adhesive tape for carpet fixing or the like. Besides being used in these applications, the pressure-sensitive adhesive sheets can be extensively utilized in various applications where high-holding power is required.

The invention will be explained below in more detail by reference to Examples thereof, but the invention should not be construed as being limited to the following Examples only.

EXAMPLE 1

Natural rubber (smoked sheet) was masticated with a Banbury mixer to obtain a masticated rubber having a Mooney viscosity $ML_{1+4}$ (120° C.) of 40. Into a 5-liter pressure kneader heated at 120° C. was introduced 1,500 g of the rubber. Therein to were further introduced 750 g of a calcium carbonate powder and 30 g of an antioxidant simultaneously. These ingredients were kneaded together for about 5 minutes. Furthermore, 1,350 g of a tackifier was added thereto in several portions, and the mixture was kneaded for about 10 minutes. Finally, 60 g of an isocyanate crosslinking agent (trade name "CORONATE L", manufactured by Nippon Polyurethane Co., Ltd.) was introduced to conduct a crosslinking treatment for about 10 minutes with kneading. The mixture was then taken out of the kneader. Thus, a solid type pressure-sensitive adhesive composition was prepared.

The tackifier used above was a mixture composed of 1,125 g of a petroleum resin (trade name "Quintone S100", manufactured by Nippon Zeon Co., Ltd.), 150 g of a terpene phenol resin (trade name "Sumiliteresin", manufactured by Sumitomo Durez Co., Ltd.), and 75 g of a liquid resin (trade name "Dimerone", manufactured by Yasuharu Yushi Kogyo Co., Ltd.). The solid type pressure-sensitive adhesive composition obtained above was applied in a thickness of 30 $\mu$m on a substrate (polypropylene film having a thickness of 60 $\mu$m) with a 10-inch four-roll calender coater while heating the composition at 100° C. Thus, a pressure-sensitive adhesive tape was produced.

EXAMPLE 2

A solid type pressure-sensitive adhesive composition was prepared in the same manner as in Example 1, except that a mixture of 1,200 g of a petroleum resin (trade name "Quintone G115", manufactured by Nippon Zeon Co., Ltd.) and 150 g of a terpene phenol resin (trade name "YS Polyster T30", manufactured by Yasuhara Yushi Kogyo Co., Ltd.) was used as a tackifier. This composition was used to produce a pressure-sensitive adhesive tape in the same manner as in Example 1.

COMPARATIVE EXAMPLE 1

A solid type pressure-sensitive adhesive composition was prepared in the same manner as in Example 1, except that an isocyanate crosslinking agent was not introduced and a crosslinking treatment was not conducted. This composition was used to produce a pressure-sensitive adhesive tape in the same manner as in Example 1.

COMPARATIVE EXAMPLE 2

Into a 5-liter pressure kneader heated at 120° C. was introduced 1,000 g of butyl rubber (trade name "IIR268", manufactured by Japan Synthetic Rubber Co., Ltd.). Thereinto were further introduced 1,000 g of a calcium carbonate powder, 200 g of polybutene (trade name "HV300", manufactured by Nippon Oil Co., Ltd.), and 100 g of a process oil (trade name "PW90", manufactured by Idemitsu Kosan-Co., Ltd.) simultaneously. These ingredients were kneaded together for about 5 minutes. Furthermore, 300 g of a petroleum resin (trade name "Escorez 1202", manufactured by Exxon Chemical Japan Ltd.) was added as a tackifier thereto in several portions. The resultant mixture was kneaded for about 10 minutes and then taken out of the kneader. In a mixing roll mill heated at 150° C. was placed 1,040 g of the mixture, followed by a vulcanizing agent (consisting of 4 g of sulfur, 2 g of "Nocceler TT", and 2 g of "Nocceler CZ", the latter two being manufactured by Ouchi-Shinko Chemical Industrial Co., Ltd.) . A vulcanization treatment was conducted for 15 minutes with kneading, and the resultant mixture was taken out. Thus, a solid type pressure-sensitive adhesive composition was prepared. This composition was used to produce a pressure-sensitive adhesive tape in the same manner as in Example 1.

COMPARATIVE EXAMPLE 3

A solid type pressure-sensitive adhesive composition was prepared in the same manner as in Example 1, except that the heating temperature in the pressure kneader was changed to 160° C. and that 4 g of a vulcanizing agent (trade name "Nocceler TT", manufactured by Ouchi-Shinko Chemical Industrial Co., Ltd.) was introduced in place of the isocyanate crosslinking agent to conduct vulcanization for 15 minutes with kneading. This composition was used to produce a pressure-sensitive adhesive tape in the same manner as in Example 1.

The pressure-sensitive adhesive tapes obtained in Examples 1 and 2 and Comparative Examples 1 to 3 were subjected to an adhesive strength test and a holding power test by the following methods. The results of these tests are shown in the Table below.

Adhesive Strength Test

A pressure-sensitive adhesive tape having a width of 25 mm was applied to a stainless steel plate. The tape was peeled from the stainless steel plate at 23° C. at a peel angle of 180° and a peel rate of 300 mm/min to measure the adhesive strength (N/25 mm width).

Holding Power Test

A pressure-sensitive adhesive tape having a size of 25 mm×25 mm was applied to a stainless steel plate. In a 40° C. atmosphere, a static load of 2 kg was imposed on one end of the pressure-sensitive adhesive tape and the time (min) required for the pressure-sensitive adhesive tape to shift and fall off the plate was measured.

TABLE

|  | Adhesive strength test (N/25 mm width) | Holding power test (min) |
| --- | --- | --- |
| Example 1 | 6.1 | 386 |
| Example 2 | 8.5 | 342 |
| Comparative Example 1 | 6.9 | 15 |
| Comparative Example 2 | 2.8 | 7 |
| Comparative Example 3 | 7.3 | 6 |

The results given in the above Table show that the pressure-sensitive adhesive tapes obtained in Examples 1 and 2 according to the invention were excellent not only in adhesive strength but in holding power and had a high holding power even at a temperature as high as 40° C. although the thickness of the adhesive layer made of the pressure-sensitive adhesive composition was as small as 30 μm. It was further ascertained in the adhesive strength test and holding power test that neither adhesive protrusion nor adhesive remaining was observed in these pressure-sensitive adhesive tapes because of such adhesive properties.

In contrast, the pressure-sensitive adhesive tape of Comparative Example 1, in which crosslinking with an isocyanate crosslinking agent was omitted, had a considerably poor holding power. In the pressure-sensitive adhesive tape of Comparative Example 3, in which crosslinking with a vulcanizing agent was conducted and kneading was performed at too high a temperature, the poor holding power remained almost unimproved. Due to these adhesive properties, the pressure-sensitive adhesive tapes of Comparative Examples 1 and 3 suffered considerable adhesive protrusion and adhesive remaining in the adhesive strength test and holding power test. Furthermore, the pressure-sensitive adhesive tape of Comparative Example 2, in which butyl rubber was vulcanized with a vulcanizing agent, was inferior in both adhesive strength and holding power because of the too high degree of vulcanization.

As described above, the solid type pressure-sensitive adhesive composition of the invention is produced by adding a tackifier to a rubbery polymer and crosslinking the polymer with an isocyanate crosslinking agent. Because of this constitution, the pressure-sensitive adhesive sheet of the invention is excellent in both adhesive strength and holding power, is inhibited from suffering a decrease in holding power especially when allowed to stand at a high temperature or made to have a reduced adhesive layer thickness, and is free from the problem of adhesive protrusion or adhesive remaining. Furthermore, since the composition softens upon heating to become easily moldable, pressure-sensitive adhesive tapes having an adhesive layer thickness reduced to any desired value can be produced despite the nonuse of an organic solvent or water. Moreover, a drying step is unnecessary after coating because of the nonuse of an organic solvent or water. The pressure-sensitive adhesive sheet of the invention therefore contributes to energy saving and is desirable from the standpoint of preservation of the global environment.

What is claimed is:

1. A method for producing a solid type pressure-sensitive adhesive composition comprising adding, in the absence of a solvent, a tackifier to a rubbery polymer and kneading the resulting mixture with an isocyanate crosslinking agent, in the absence of a solvent, for a kneading time of 5–40 minutes, to crosslink the polymer where the crosslinking reaction proceeds simultaneously with the kneading of the mixture, and thereby produce said solid pressure-sensitive adhesive composition, wherein the treatment is conducted at a temperature of about 80 to 160° C.

2. The method for producing a solid type pressure-sensitive adhesive composition of claim 1, wherein said rubbery polymer is natural rubber.

3. The method for producing a solid type pressure-sensitive adhesive composition of claim 2, wherein said natural rubber has a Mooney viscosity $ML_{1+4}$ (100° C.) of 20 to 100.

4. The method for producing a solid type pressure-sensitive adhesive composition of claim 1, wherein said tackifier is a resin compatible with said rubbery polymer.

5. The method for producing a solid type pressure-sensitive adhesive composition of claim 1, wherein said tackifier is used in an amount of 20 to 200 parts by weight per 100 parts of said rubber polymer.

6. The method for producing a solid type pressure-sensitive adhesive composition of claim 1, wherein said isocyanate crosslinking agent is a polyisocyanate compound having two or more isocyanate groups in the molecule.

7. The method for producing a solid type pressure-sensitive adhesive composition of claim 1, wherein said isocyanate crosslinking agent is used in an amount of 0.1 to 20 parts by weight per 100 parts by weight of said rubbery polymer.

8. A method of producing pressure-sensitive adhesive sheets comprising calendering or extrusion coating, in the absence of a solvent, a solid type pressure-sensitive adhesive composition obtained by a method comprising adding, in the absence of a solvent, a tackifier to a rubbery polymer and kneading the resulting mixture with an isocyanate crosslinking agent for a kneading time of 5–40 minutes, in the absence of a solvent, to crosslink the polymer where the crosslinking reaction proceeds simultaneously with the kneading of the mixture, on a substrate, wherein the treatment is conducted at a temperature of 80 to 160° C.

9. The method for producing pressure-sensitive adhesive sheets of claim 8, wherein said layer comprising the pressure-sensitive adhesive composition has a thickness of about 10 to 200 µm.

10. The method for producing pressure-sensitive adhesive sheets of claim 8, wherein said rubbery polymer is natural rubber.

11. The method for producing pressure-sensitive adhesive sheets of claim 10, wherein said natural rubber has a Mooney viscosity $ML_{1+4}$ (100° C.) 20 to 100.

12. The method for producing pressure-sensitive adhesive sheets claim 8, wherein said tackifier is a resin compatible with said rubbery polymer.

13. The method for producing pressure-sensitive adhesive sheets of claim 8, wherein said tackifier is used in an amount of 20 to 200 parts by weight per 100 parts of said rubber polymer.

14. The method for producing pressure-sensitive adhesive sheets of claim 8, wherein said isocyanate crosslinking agent is a polyisocyanate compound having two or more isocyanate groups in the molecule.

15. The method for producing pressure-sensitive adhesive sheets of claim 8, wherein said isocyanate crosslinking agent is used in an amount of 0.1 to 20 parts by weight per 100 parts by weight of said rubbery polymer.

* * * * *